United States Patent
Bao

(10) Patent No.: US 12,527,935 B2
(45) Date of Patent: Jan. 20, 2026

(54) HUMIDIFIER

(71) Applicant: Fisher & Paykel Healthcare Limited, Auckland (NZ)

(72) Inventor: Guohua Bao, Auckland (NZ)

(73) Assignee: Fisher & Paykel Healthcare Limited, Auckland (NZ)

( * ) Notice: Subject to any disclaimer, the term of this patent is extended or adjusted under 35 U.S.C. 154(b) by 1276 days.

(21) Appl. No.: 16/769,031

(22) PCT Filed: Nov. 29, 2018

(86) PCT No.: PCT/IB2018/059481
§ 371 (c)(1),
(2) Date: Jun. 2, 2020

(87) PCT Pub. No.: WO2019/111110
PCT Pub. Date: Jun. 13, 2019

(65) Prior Publication Data
US 2021/0220600 A1   Jul. 22, 2021

Related U.S. Application Data

(60) Provisional application No. 62/595,216, filed on Dec. 6, 2017.

(51) Int. Cl.
*A61M 16/16* (2006.01)
*A61M 16/10* (2006.01)
(Continued)

(52) U.S. Cl.
CPC .......... *A61M 16/16* (2013.01); *A61M 16/109* (2014.02); *A61M 16/1095* (2014.02);
(Continued)

(58) Field of Classification Search
CPC .. A61M 16/16; A61M 16/161; A61M 16/162; A61M 16/164; A61M 16/00;
(Continued)

(56) References Cited

U.S. PATENT DOCUMENTS 1,865,563 A * 7/1932 Greenwald ............... F24D 5/00
237/78 R
3,755,996 A * 9/1973 Klein ...................... F22B 37/32
55/459.1
(Continued)

FOREIGN PATENT DOCUMENTS

CN   101583395   11/2009
CN   205268793   6/2016
(Continued)

OTHER PUBLICATIONS

International Search Report; PCT/IB2018/059481, filed Nov. 29, 2019; dated Mar. 19, 2019; 5 pages.

*Primary Examiner* — Margaret M Luarca
*Assistant Examiner* — Mishal Zahra Hussain
(74) *Attorney, Agent, or Firm* — VIA LLP

(57) ABSTRACT

There is provided a humidifier for a respiratory therapy system that includes a humidification chamber having an inner wall spaced from an outer wall to form a wall cavity between the inner and outer walls. A gas flow path is located within the wall cavity. Gas, such as air, flows along the gas flow path from an inlet to the humidification chamber to an outlet of the humidification chamber. Optionally, the gas flow path may follow a helical route through the wall cavity.

15 Claims, 17 Drawing Sheets

(51) Int. Cl.
*A62B 7/00* (2006.01)
*A62B 9/00* (2006.01)

(52) U.S. Cl.
CPC ............... *A62B 7/00* (2013.01); *A62B 9/003* (2013.01); *A61M 2205/362* (2013.01); *A61M 2205/3633* (2013.01); *A61M 2206/14* (2013.01)

(58) Field of Classification Search
CPC .. A61M 16/0054; A61M 16/01; A61M 16/06; A61M 16/0891; A61M 16/1075; A61M 16/108; A61M 16/1085; A61M 16/109; A61M 16/12; A61M 16/122; A61M 16/14; A61M 2016/1035; A61M 2016/104; A61M 2016/1045
See application file for complete search history.

(56) References Cited

U.S. PATENT DOCUMENTS

| | | | | |
|---|---|---|---|---|
| 3,780,567 A * | 12/1973 | Ovard | G01N 1/2247 | 261/DIG. 11 |
| 3,836,079 A * | 9/1974 | Huston | A61M 16/125 | 239/338 |
| 4,005,999 A * | 2/1977 | Carlson | B01D 47/024 | 261/119.1 |
| 4,198,290 A * | 4/1980 | Summers | B01D 45/12 | 209/710 |
| 4,943,704 A * | 7/1990 | Rabenau | A61M 16/142 | 261/142 |
| 5,042,169 A * | 8/1991 | Vero | B65G 53/60 | 406/123 |
| 5,634,517 A * | 6/1997 | Linden | A61B 5/097 | 165/142 |
| 5,848,592 A * | 12/1998 | Sibley | A62B 9/003 | 128/205.27 |
| 6,202,991 B1 * | 3/2001 | Coniglio | B01F 23/23121 | 261/DIG. 65 |
| 6,398,197 B1 * | 6/2002 | Dickinson | A61M 16/16 | 261/DIG. 65 |
| 6,402,799 B1 * | 6/2002 | Kokubo | B04C 3/06 | 55/432 |
| 6,508,864 B2 * | 1/2003 | Day | B04C 5/10 | 96/321 |
| 6,520,021 B1 * | 2/2003 | Wixey | A61M 16/08 | 73/714 |
| 6,739,456 B2 * | 5/2004 | Svoronos | B04C 9/00 | 209/139.1 |
| 6,786,475 B2 * | 9/2004 | Salter | A61M 16/208 | 261/122.1 |
| 7,448,146 B2 * | 11/2008 | Cho | B04C 5/081 | 34/601 |
| 7,616,871 B2 * | 11/2009 | Kramer | A61M 16/109 | 392/386 |
| 9,119,933 B2 * | 9/2015 | Bedford | A61M 16/1095 | |
| 9,656,039 B2 * | 5/2017 | Kramer | A61M 16/1095 | |
| 9,707,370 B2 * | 7/2017 | Smith | A61M 16/0066 | |
| 9,987,455 B2 * | 6/2018 | Stoks | A61M 16/16 | |
| 2005/0268910 A1 * | 12/2005 | Nord | A61M 16/16 | 128/204.14 |
| 2006/0055069 A1 * | 3/2006 | DiMatteo | A61M 16/16 | 261/DIG. 65 |
| 2006/0120968 A1 * | 6/2006 | Niven | A61M 16/14 | 128/200.23 |
| 2006/0124127 A1 * | 6/2006 | Du | A61M 16/16 | 128/201.13 |
| 2007/0157928 A1 * | 7/2007 | Pujol | A61M 16/16 | 261/119.1 |
| 2008/0135044 A1 * | 6/2008 | Freitag | A61M 16/16 | 128/205.24 |
| 2008/0245365 A1 * | 10/2008 | Genger | A61M 16/16 | 392/394 |
| 2009/0000620 A1 * | 1/2009 | Virr | A61M 16/16 | 261/150 |
| 2009/0056715 A1 * | 3/2009 | Cortez, Jr. | A61M 16/109 | 128/203.26 |
| 2009/0114221 A1 * | 5/2009 | Nagorny | A61M 16/161 | 128/204.19 |
| 2009/0194106 A1 * | 8/2009 | Smith | A61M 16/0616 | 128/203.16 |
| 2010/0043791 A1 * | 2/2010 | McAuley | A61M 16/16 | 128/203.14 |
| 2010/0132708 A1 * | 6/2010 | Martin | A61M 16/0066 | 128/204.21 |
| 2011/0100360 A1 * | 5/2011 | Faram | A61M 16/127 | 128/202.16 |
| 2011/0100363 A1 * | 5/2011 | Barclay | A61M 16/109 | 128/203.26 |
| 2011/0146216 A1 * | 6/2011 | Tjeenk Willink | B04C 3/06 | 55/459.1 |
| 2012/0285454 A1 * | 11/2012 | Nibu | A61M 16/16 | 128/204.18 |
| 2013/0174843 A1 * | 7/2013 | Smith | A61M 16/16 | 128/203.26 |
| 2014/0001658 A1 * | 1/2014 | Virr | A61M 16/1075 | 261/142 |
| 2014/0020684 A1 * | 1/2014 | Klasek | A61M 16/16 | 128/203.26 |
| 2014/0053839 A1 * | 2/2014 | Nakamura | A61M 16/16 | 128/203.16 |
| 2014/0137861 A1 * | 5/2014 | Feldhahn | A61M 16/0875 | 128/203.12 |
| 2014/0166012 A1 | 6/2014 | Steg et al. | | |
| 2014/0261419 A1 * | 9/2014 | Hsiao | A61M 16/16 | 128/204.14 |
| 2015/0048530 A1 * | 2/2015 | Cheung | A61M 16/024 | 261/135 |
| 2015/0224278 A1 * | 8/2015 | Addington | A61M 16/0816 | 128/200.21 |
| 2015/0265796 A1 | 9/2015 | Miller | | |
| 2016/0045704 A1 * | 2/2016 | Van Schalkwyk | A61M 16/16 | 128/202.26 |
| 2016/0129212 A1 * | 5/2016 | Dimatteo | A61M 16/024 | 128/202.14 |
| 2017/0035984 A1 * | 2/2017 | Smith | A61M 16/0666 | |
| 2017/0072161 A1 * | 3/2017 | Iwatschenko | A61M 16/109 | |
| 2017/0119992 A1 * | 5/2017 | Visveshwara | A61M 16/16 | |
| 2017/0165445 A1 * | 6/2017 | Zereshkian | A62B 7/10 | |
| 2017/0197057 A1 * | 7/2017 | Osborne | A61M 16/024 | |
| 2017/0319811 A1 * | 11/2017 | Foote | A61M 16/142 | |
| 2017/0336086 A1 * | 11/2017 | Lin | A61M 16/109 | |
| 2018/0028774 A1 * | 2/2018 | Lin | A61M 16/12 | |
| 2018/0243524 A1 * | 8/2018 | Virr | A61M 16/022 | |
| 2018/0333556 A1 * | 11/2018 | Ormrod | A61M 16/0051 | |

FOREIGN PATENT DOCUMENTS

| | | |
|---|---|---|
| DE | 29909611 U1 | 9/1999 |
| DE | 10016005 A1 | 12/2001 |
| WO | WO 2006/012877 | 2/2006 |
| WO | 2008056993 A2 | 5/2008 |
| WO | WO 2012/135912 A1 | 10/2012 |

* cited by examiner

HUMIDIFIER

TECHNICAL FIELD

The present disclosure generally relates to respiratory gas therapy. More particularly, the present disclosure relates to gas humidification devices for use with respiratory gas therapy systems.

DESCRIPTION OF THE RELATED ART

A patient suffering from a respiratory illness can have difficulty engaging in effective respiration. In some cases, it is useful to provide the patient with a therapy that can improve the ventilation of the patient. In some situations, the patient can be provided with a respiratory therapy system that includes a gas source, an interface that may be used to transmit gas to an airway of a patient, and a conduit extending between the gas source and the interface. Gas delivered to the airway of the patient from the gas source can help to promote adequate ventilation of the patient. The gas source may include, for example, a container of air or another gas suitable for inspiration, e.g., oxygen or nitric oxide, a mechanical blower capable of propelling a gas through the conduit to the interface, or some combination of both. The respiratory therapy system can include a gas humidifier that can humidify and heat gases passing through the respiratory therapy system to improve patient comfort and/or improve the prognosis of the patient's respiratory illness. The gas humidifier can include a water reservoir and a heating element for heating the water in the reservoir. As the water heats up, water vapor is formed which can join the stream of gases passing through the gas humidifier. Such respiratory therapy systems include CPAP (continuous positive airway pressure) systems, non-invasive ventilation (NIV) and nasal high flow systems.

Conventional gas humidifiers typically heat fluid within a fluid reservoir of a humidification chamber. This is typically achieved using a metal plate at the base of the humidifier that is heated using an external heat source. Breathing gas or air is caused to flow across the fluid reservoir to heat and humidify the gas.

SUMMARY

In accordance with a first aspect, there is provided a humidifier for a respiratory therapy system, the humidifier comprising: a base, a top wall and one or more outer side walls extending between the base and the top wall to form a humidification chamber within which a fluid source can be held. In a preferred form, a fluid reservoir is located in the humidification chamber. The humidifier further comprises at least one inlet for receiving breathing gas, an outlet for delivering humidified breathing gas, and a gas flow path that extends between the inlet and outlet. One or more inner side walls are spaced at a distance from the outer side wall(s) to form a wall cavity.

In one form, the wall cavity may be at least partially filled with a heat insulating material. For example, the wall cavity may be at least partially filled with gas or with a foam material.

Alternatively or additionally, at least a portion of the gas flow path may be located within the wall cavity before passing across the fluid reservoir or the humidification chamber. In one form, the humidifier comprises a guiding system comprising at least one baffle defining a gas flow path through the wall cavity. For example, the wall cavity may comprise one or more baffles that have a substantially perpendicular orientation relative to the base of the humidifier and that define a tortuous gas flow path through the wall cavity. In another form, the wall cavity comprises one or more sloping baffles that define a gas flow path through the wall cavity. Alternatively, the wall cavity may comprise one or more helical baffles that define a helical gas flow path through the wall cavity. Preferably, the one or more sloping baffles define(s) a helical gas flow path through the wall cavity. In one form, the helical gas flow path includes three turns.

Optionally, the inner and/or outer wall(s) may be transparent or semi-transparent.

In one form, the inlet of the humidifier is located proximate to the base of the humidifier.

Optionally, the inlet is located proximate to the top wall of the humidifier.

In one form, a plurality of inlets are provided proximate to the base or top wall of the humidifier.

Preferably, the inner and outer side walls of the humidifier are substantially cylindrical.

In accordance with a second aspect, there is provided a humidification chamber for a respiratory therapy system, the humidification chamber being configured to hold a fluid in a fluid reservoir, and comprising: a base, a top wall and an outer side wall extending between the base and the top wall; an inner side wall spaced at a distance from the outer side wall to form a wall cavity between the inner side wall and the outer side wall, the inner side wall at least partially defining the fluid reservoir; a guide extending from the inner side wall to the outer side wall across the wall cavity, the guide defining an insulating channel through the wall cavity; a chamber inlet for receiving breathing gas, the chamber inlet comprising an opening into the wall cavity; a fluid reservoir inlet, the fluid reservoir inlet providing a path for gas to flow from the wall cavity to the fluid reservoir; and a delivery outlet for delivering breathing gas from the fluid reservoir externally of the humidification chamber. The insulating channel, fluid reservoir inlet and fluid reservoir provide a chamber gas flow path that extends between the chamber inlet and the delivery outlet.

In one form, the humidification chamber comprises an inner top wall, the inner top wall forming a top of the humidification space, the fluid reservoir inlet extending through the inner top wall. Preferably, the base, inner side wall and inner top wall of the humidification chamber form the fluid reservoir.

In one form, the humidification chamber also comprises a heating element that is configured to be heated in order to provide heat to the fluid in the humidification chamber.

Optionally, the chamber inlet comprises an opening into the wall cavity through the outer side wall.

In one form, the guide is configured such that the insulating channel comprises a helical portion between the chamber inlet and the fluid reservoir inlet.

In accordance with a third aspect, there is provided a humidifier for a respiratory therapy system, the humidifier comprising the humidification chamber of the second aspect of the invention.

The invention consists in the foregoing and also envisages constructions of which the following gives examples only.

BRIEF DESCRIPTION OF THE DRAWINGS

Specific embodiments and modifications thereof will become apparent to those skilled in the art from the detailed description herein having reference to the figures that follow, of which.

DETAILED DESCRIPTION

In general, the invention relates to a humidifier for humidifying breathing gases in a respiratory therapy system. For example, the humidifier may be used with or may form part of a CPAP, Bi-Level, Non-Invasive Ventilation, nasal high flow or other respiratory therapy system.

Figure 1:
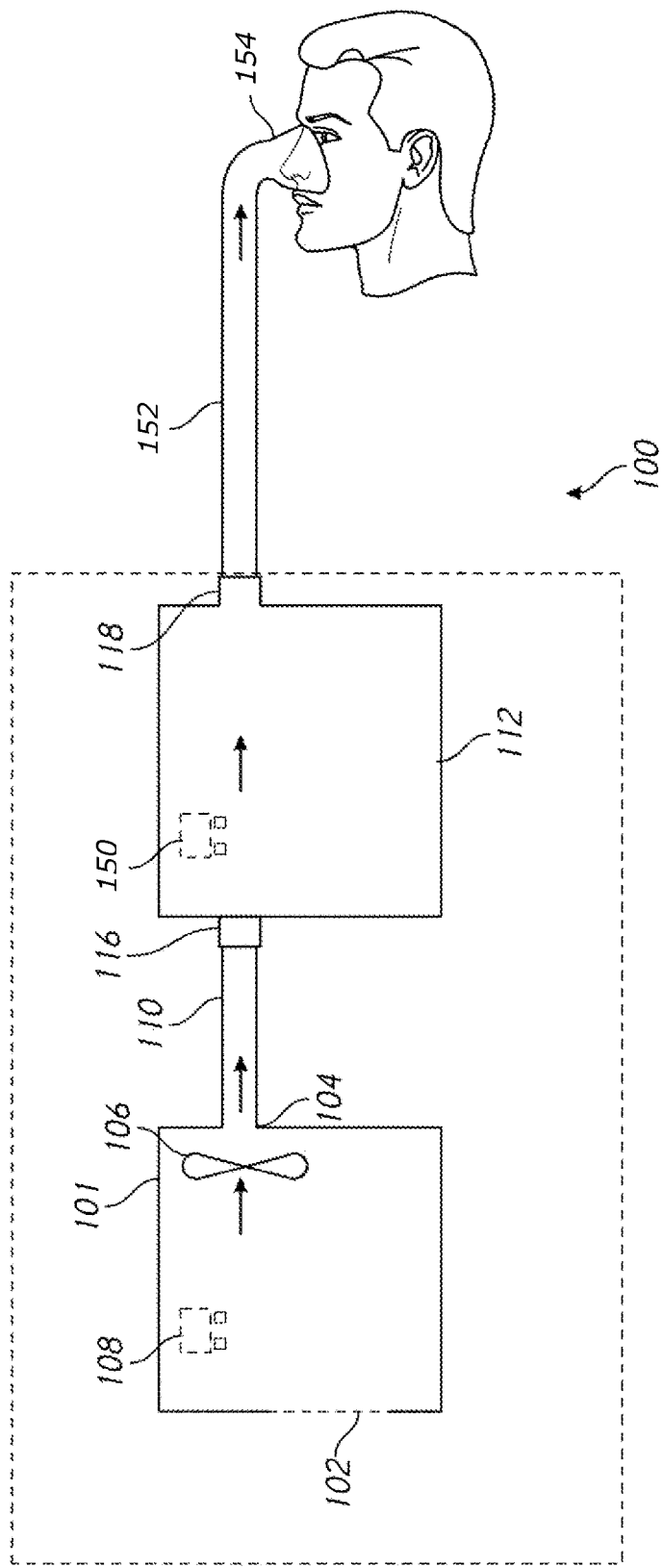
FIG. 1 is a schematic illustration of one form of respiratory therapy system that comprises a humidification system.
Figure 2:
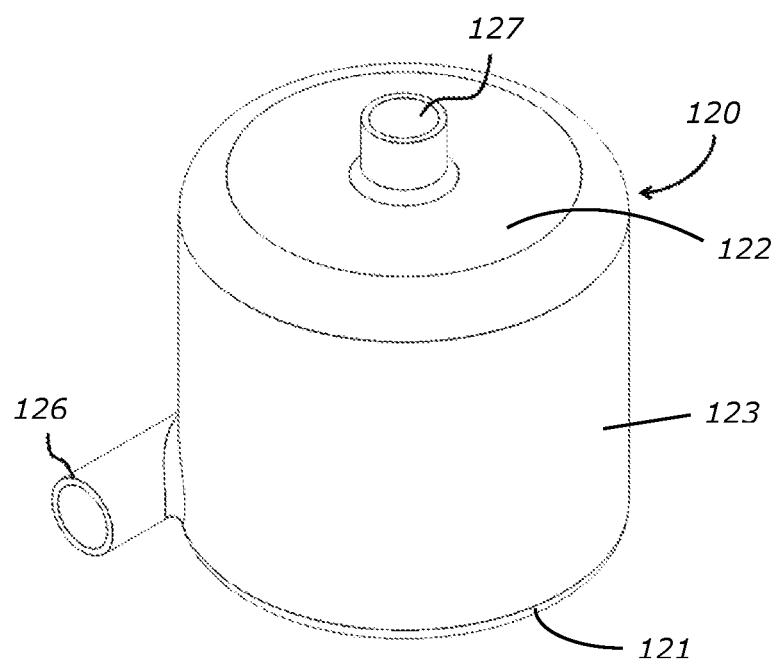
FIG. 2 is a perspective view of one form of humidification chamber according to the invention.
Figure 3:
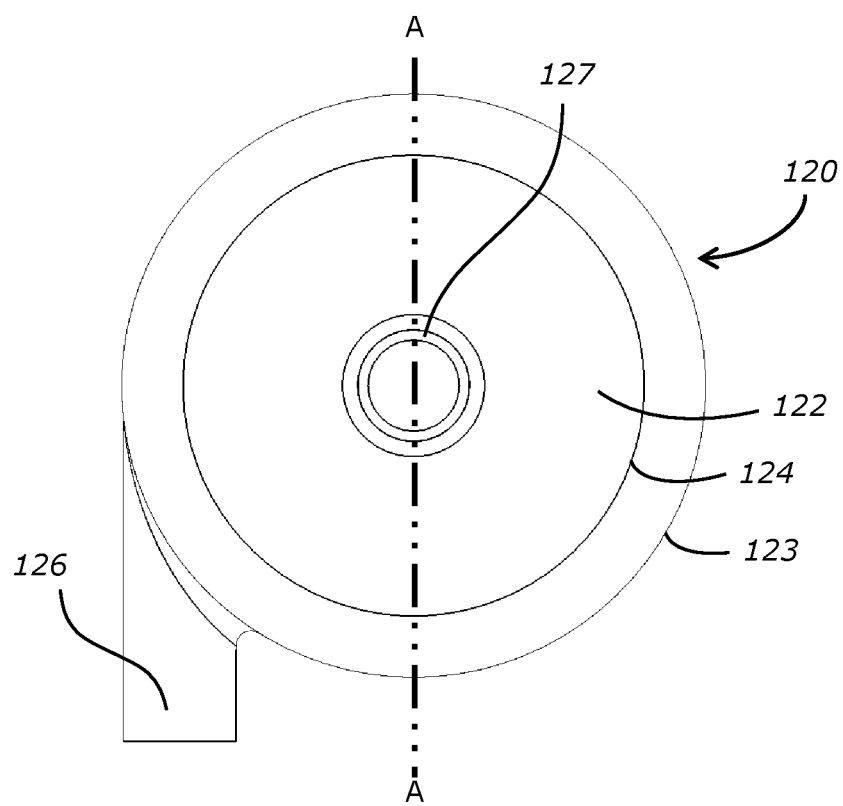
FIG. 3 is a top view of the humidification chamber of FIG. 2.
Figure 4:
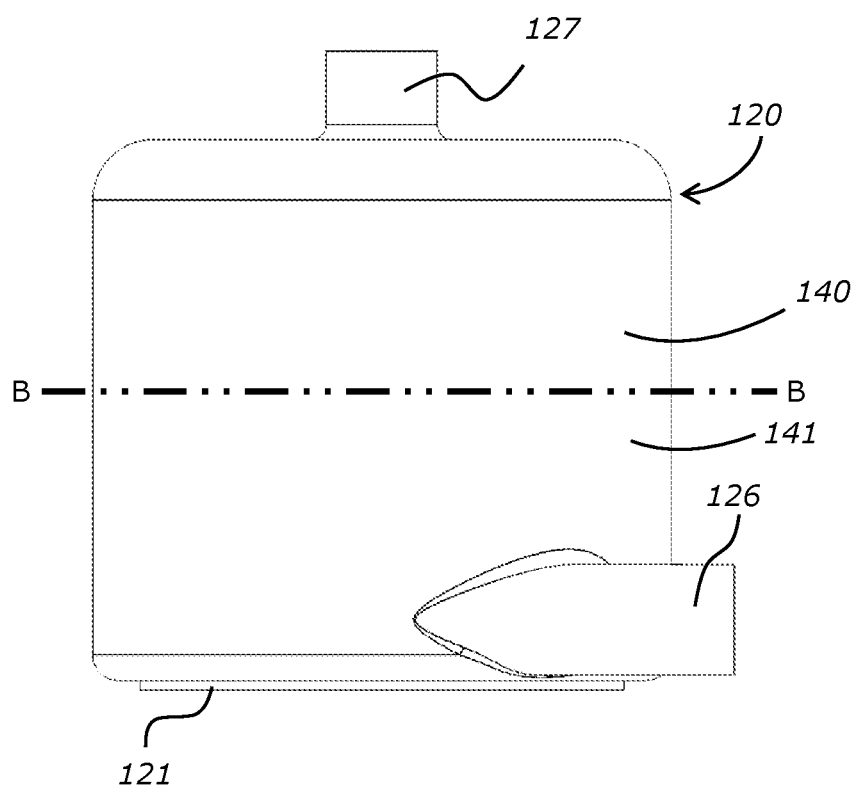
FIG. 4 is a side view of the humidification chamber of FIG. 2.
Figure 5:
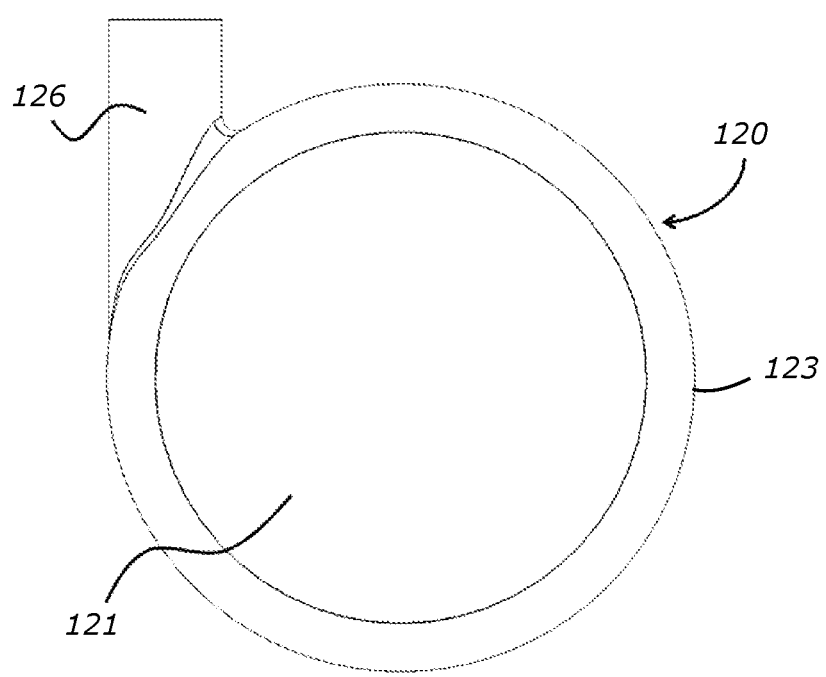
FIG. 5 is a bottom view of the humidification chamber of FIG. 2.

With reference to FIG. 1, a possible configuration for a respiratory therapy system 100 is shown. In the illustrated configuration, the respiratory therapy system 100 may comprise a flow generator 101. The flow generator 101 may comprise a gas inlet 102 and a gas outlet 104. The flow generator 101 may comprise a blower 106. The blower 106 may comprise a motor. The motor may comprise a stator and a rotor. The rotor may comprise a shaft. An impeller may be linked to the shaft. In use, the impeller may rotate concurrently with the shaft to draw in gas from the gas inlet 102. The flow generator 101 may comprise a user interface 108 which may comprise one or more buttons, knobs, dials, switches, levers, touch screens, speakers, displays, and/or other input or output modules that a user might use to view data and/or to input commands into the flow generator 101 to control its operation and/or the operation of other components of the respiratory therapy system 100. The flow generator 101 may pass gas through the gas outlet 104 to a first conduit 110. The first conduit 110 may pass the gas to a gas humidifier 112 that may be used to entrain moisture in the gas in order to provide a humidified gas stream. The gas humidifier 112 may comprise a humidifier inlet 116 and a humidifier outlet 118. The gas humidifier 112 may comprise fluid, such as water or another liquid or fluent solid suitable for use in gas humidification (elsewhere in this disclosure collectively referred to as water). The gas humidifier 112 may also comprise a heater that may be used to heat the water in the gas humidifier 112 to encourage water vaporization and/or entrainment in the gas flow and/or increase the temperature of gases passing through the gas humidifier 112. The heater may, for example, comprise a resistive heating element. The gas humidifier 112 may comprise a user interface 150 which may comprise one or more buttons, knobs, dials, switches, levers, touch screens, speakers, displays and/or other input or output modules that a user might use to view data and/or input commands into the gas humidifier 112 to control its operation and/or the operation of other aspects of the respiratory therapy system 100. Various configurations for the gas humidifier 112 are described elsewhere in this disclosure and in the accompanying figures. Gas may then pass from the humidifier outlet 118 to a second conduit 152. The second conduit 152 may comprise a conduit heater.

The conduit heater may be used to add heat to gases passing through the second conduit 152. The heat may reduce or eliminate the likelihood of condensation of water vapour entrained in the gas stream along a wall of the second conduit 152. The conduit heating arrangement may comprise one or more resistive wires located in, on, around, or near a wall of the second conduit 152. Gas passing through the second conduit 152 may then enter a patient interface 154 that may pneumatically link the respiratory therapy system 100 to an airway of a patient. The patient interface 154 may comprise a sealing or non-sealing interface and may comprise, for example, a nasal mask, an oral mask, an oro-nasal mask, a full face mask, a nasal pillows mask, a nasal cannula, an endotracheal tube, a combination of any of the above or some other gas conveying system or apparatus.

In the illustrated configuration, and as implied above, the respiratory therapy system 100 may operate as follows. Gas may be drawn into the flow generator 101 through the gas inlet 102 due to the rotation of an impeller of the motor of the blower 106. The gas may then be propelled out of the gas outlet 104 and along the first conduit 110. The gas may enter the gas humidifier 112 through the humidifier inlet 116. Once in the gas humidifier 112, the gas may pass along a gas flow path to the outlet 118 of the humidifier. As the gas passes along the flow path, the gas entrains moisture when passing over or near fluid, such as water in the gas humidifier 112. Optionally, the water/fluid may be held within a water reservoir in the gas humidifier 112. The water may be heated by the heating arrangement, which may aid in the humidification and/or heating of the gas passing through the gas humidifier 112. The gas may leave the gas humidifier 112 through the humidifier outlet 118 and enter the second conduit 152. Gas may be passed from the second conduit 152 to the patient interface 154, where the gas may be taken into the patient's airways to aid in the treatment of respiratory disorders. To summarize, in use, gas may pass through a gas flow path extending from the gas inlet 102 of the flow generator 101 to the patient interface 154.

The illustrated configuration should not be taken to be limiting and many other configurations for the respiratory therapy system 100 are possible. In some configurations, the flow generator 101 may, for example, comprise a source or container of compressed gas (e.g., air, oxygen, etc.). The flow generator 101 or the container may comprise a valve that may be adjusted to control the flow of gas leaving the container. In some configurations, the flow generator 101 may use such a source of compressed gas and/or another gas source in lieu of the blower 106. In some configurations, the blower 106 may be used in conjunction with another gas source. In some configurations, the blower 106 may comprise a motorized blower or may comprise a bellows arrangement or some other structure adapted to generate a gas flow. In some configurations, the flow generator 101 may draw in atmospheric gases through the gas inlet 102. In some configurations, the flow generator 101 may be adapted to both draw in atmospheric gases through the gas inlet 102 and accept other gases (e.g., oxygen, nitric oxide, carbon dioxide, etc.) through the same gas inlet 102 or a different gas inlet. In yet another form, gases (such as oxygen, nitric oxide, carbon dioxide, etc.) may be introduced downstream of the blower. For example, in Bi-level therapy, supplemental oxygen can be introduced at the second conduit to be delivered with the heated and humidified gas.

In some configurations, the flow generator 101 and the gas humidifier 112 may be integrated or may share a housing. In some configurations, the first conduit 110 may not be present. In some such configurations, the flow generator 101 may, for example, directly communicate gases to the gas humidifier 112.

In some configurations, the respiratory therapy system 100 may comprise a single user interface located on the flow generator 101, the gas humidifier 112, the first or second conduit 110, 152, the patient interface 154, or another component of the respiratory therapy system 100. In some configurations, the operation of components of the respiratory therapy system 100 may be actuated wirelessly using a user interface located on a remote computing device, which may be a tablet, a mobile phone, a personal digital assistant, or another device. In some configurations, the operation of the flow generator 101, of the gas humidifier 112, or of other components or aspects of the respiratory therapy system 100 may be controlled by a controller. The controller may comprise a microprocessor. The controller may be located in or on the flow generator 101, the gas humidifier 112, or other components of the respiratory therapy system 100 or on a remote computing device. In some configurations, multiple controllers may be used.

In some configurations, the respiratory therapy system 100 may comprise one or more sensors for detecting various characteristics of gases in the respiratory therapy system 100, including pressure, flow rate, temperature, absolute humidity, relative humidity, enthalpy, gas composition, oxygen concentration, and/or carbon dioxide concentration, one or more sensors for detecting various characteristics of the patient or of the health of the patient, including heart rate, EEG signal, EKG/ECG signal, blood oxygen concentration, blood CO2 concentration, and blood glucose, and/or one or more sensors for detecting various characteristics of gases or other objects outside the respiratory therapy system 100, including ambient temperature and/or ambient humidity. One or more of the sensors may be used to aid in the control of components of the respiratory therapy system 100, including the gas humidifier 112, through the use of a closed or open loop control system (e.g., through the use of the controller mentioned above). In some configurations, the respiratory therapy system 100 may utilize a multi-limb system comprising inspiratory and expiratory gas passageways that may interface with one or more airways of the patient.

Configurations of the respiratory therapy system 100 may also be used for other applications not involving providing gases to an airway of a patient. For example, the respiratory therapy system 100 could instead be used for providing an insufflation gas in laparoscopic surgery. This may be practiced, for example, by replacing the patient interface 154 with a surgical cannula that may be inserted into an abdominal cavity that has been punctured with a trocar. Additionally, certain features, aspects and advantages of the humidification systems of the present disclosure may be utilized for other applications involving the humidification of gases, including room humidifiers or fuel cell humidifiers.

Figure 13:
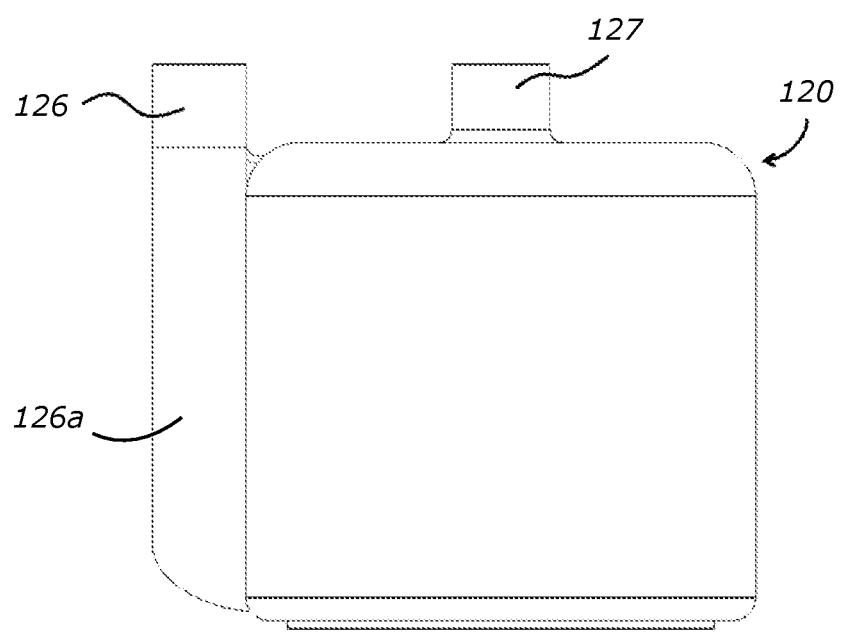
FIG. 13 is a side view of another form of humidification chamber according to the invention, in which both the inlet and outlet are located at the top of the chamber.
Figure 14:
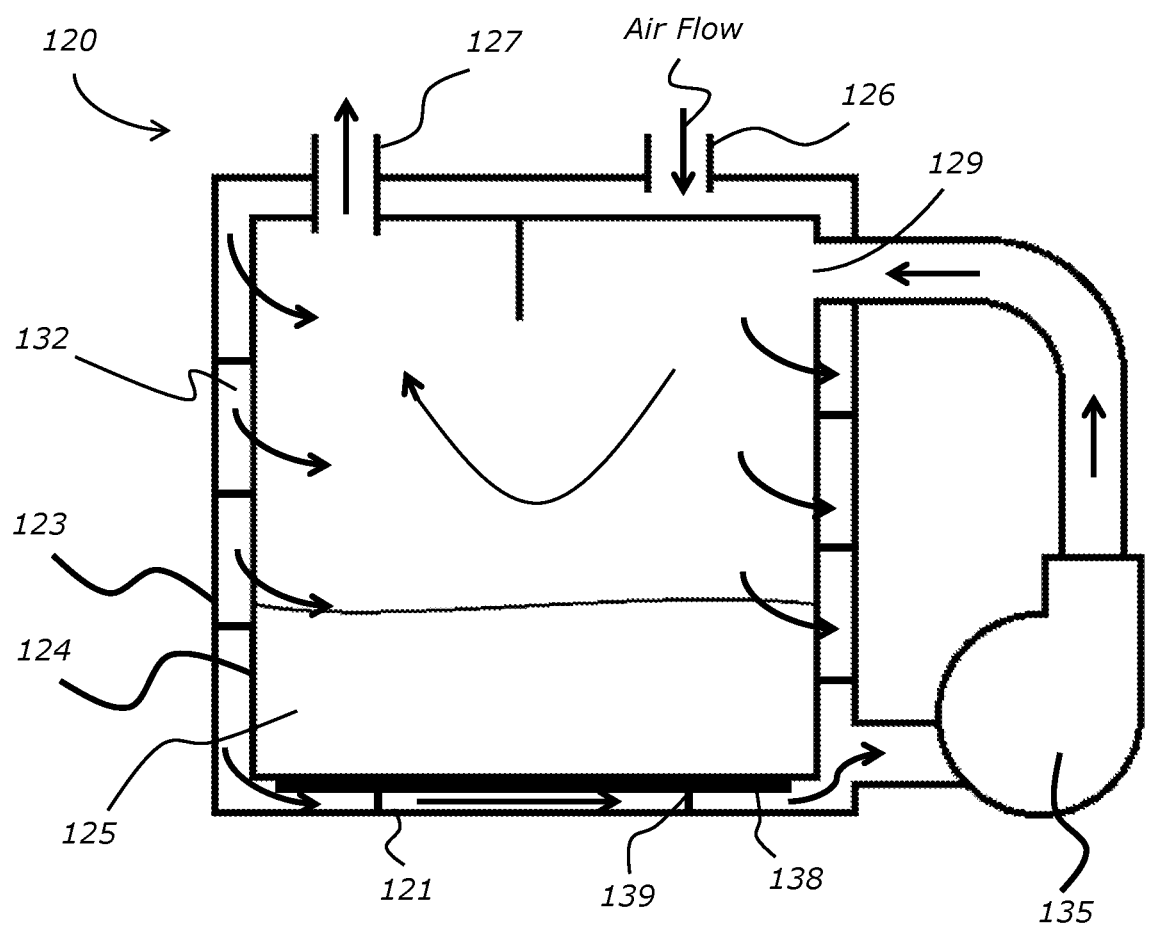
FIG. 14 is a schematic cross-sectional view of yet another form of humidification chamber according to the invention, in which the chamber base includes a heating element supported by supports.

Further attention is given to the gas humidifier 112. As shown in FIGS. 2 to 14, the humidifier 112 may comprise an insulated humidification chamber 120 comprising a base 121, a top wall 122 and one or more outer side walls 123 extending between the base 121 and the top wall 122. In one form, the top wall 122 may comprise an openable lid. The lid may be configured to hinge from the chamber 120. The lid may be configured to disengage from or detach from the chamber 120 to be completely removed from the chamber 120. At least a portion of the base 121 of the chamber is typically formed of a heat conducting material, such as metal to allow heat to be transferred from a heating element to fluid within the chamber. In a preferred form, the metal is aluminium or stainless steel. In one form, as shown in FIG. 14, the base comprises or consists of a heating element that directly heats fluid, such as water, in the fluid in the chamber 120. The gas humidifier 112 or humidification chamber 120 may be part of an integrated unit that also includes the flow generator 101, or the humidifier 112 or humidification chamber 120 may comprise a separate module that may be readily attached and detached from the flow generator 101.

The humidification chamber 120 may comprise a fluid reservoir 125 for holding a fluid, usually water, so that gas passing through the humidification chamber is humidified. In some forms, the fluid reservoir 125 holds a wick, within the humidification chamber 120.

The humidification chamber 120 further comprises at least one inlet 126 for receiving breathing gas from a flow generator, and a delivery outlet 127 through which heated, humidified breathing gas is ejected for delivery to a patient after the gas has passed through the humidification chamber. The humidification chamber inlet 126 may have an internal diameter of 17 mm, or about 15 to about 20 mm, and the outlet 127 may have an internal diameter of 19.5 mm, or about 15 to about 20 mm. Accordingly, a ratio between the internal diameter of the inlet to the internal diameter of the outlet may be 17:19.5, or may be between about 1:1.3 and 1.3:1. A gas flow path extends between the inlet 126 and the outlet 127.

In one form, the humidification chamber 120 also comprises one or more inner side walls 124 spaced from the outer side wall(s) 123 to form a wall cavity 128 and to insulate the humidification chamber 120. The inner wall 124 at least partially defines the fluid reservoir 125. The inner wall 124 may have a thickness of 1.35 mm, or between about 1 to about 2 mm. The outer wall 123 may have a thickness of 2.5 mm, or between about 1.5 to about 3 mm. The inner and outer walls may have the same thickness or different thicknesses. In one form, the inner wall may comprise a thermally conducting material and the outer wall may comprise a thermally insulating material.

In a preferred form, the humidification chamber 120 comprises a cylindrical outer wall 123 and a cylindrical inner wall 124 spaced from the outer wall 123. In another form, the humidification chamber 120 may comprise four outer walls, joining at the corners to form a substantially square or rectangular enclosure, and four inner walls that also join at the corners so that the humidification chamber has a substantially square or rectangular shape. Again the inner walls are spaced from the outer walls. It should be appreciated that the humidification chamber can be of any suitable shape, which is determined by the number and orientation of the walls of the chamber. For example, the chamber may have three outer walls to form a triangle shape or six outer walls to form a hexagonal shape. Typically, the inner walls form the same shape as the outer walls and are spaced equidistant from the outer walls. Hence, the cavity has a substantially uniform thickness. However, in some forms, the inner wall(s) may be of a different shape to the outer walls. In such an arrangement, the inner and outer walls might not be spaced equidistant apart, such that the wall cavity may have an inconsistent thickness. For example, the humidification chamber may comprise four outer walls to form a substantially square shape and a single inner wall to form a substantially cylindrical shape.

The wall cavity 128 may be used to insulate the humidification chamber 120. For example, the wall cavity 128 may be at least partially filled with a heat insulating material, such as foam or glass or plastic or polystyrene or any other suitable heat insulating material.

Figure 6:
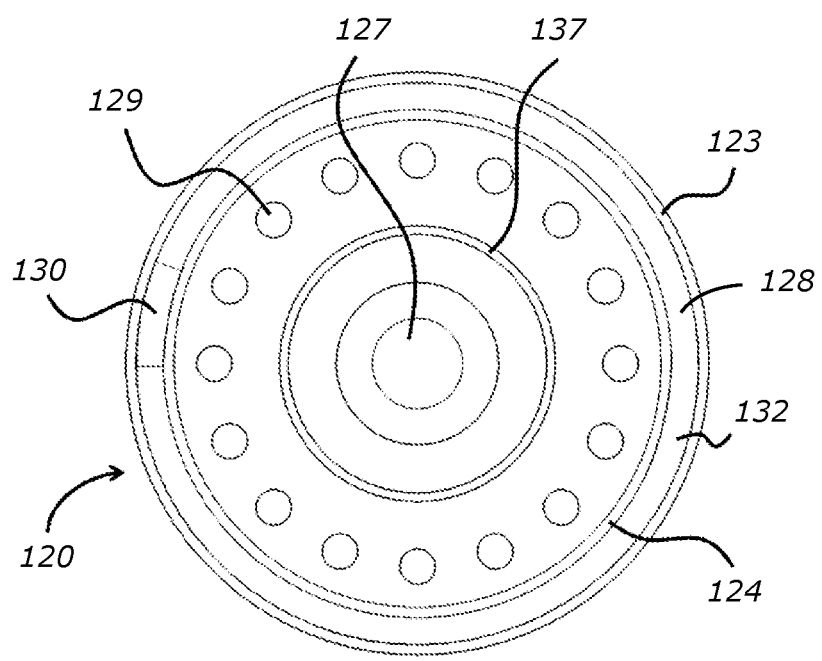
FIG. 6 is a cross-sectional top view taken along line B-B of FIG. 4.
Figure 7:
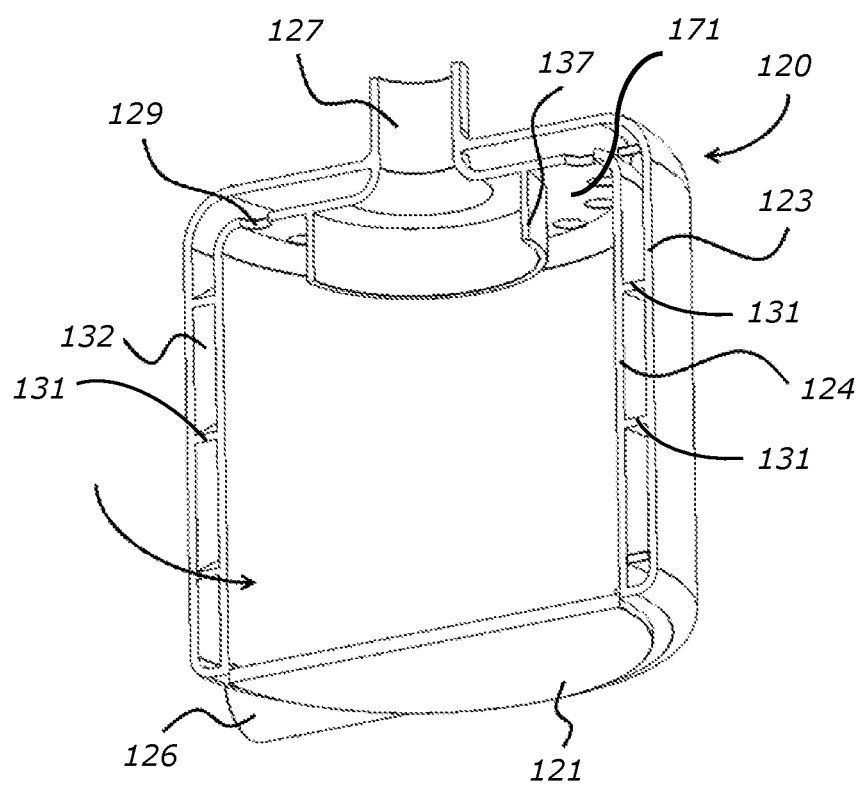
FIG. 7 is a cut-away perspective view taken along line A-A of FIG. 3.
Figure 8:
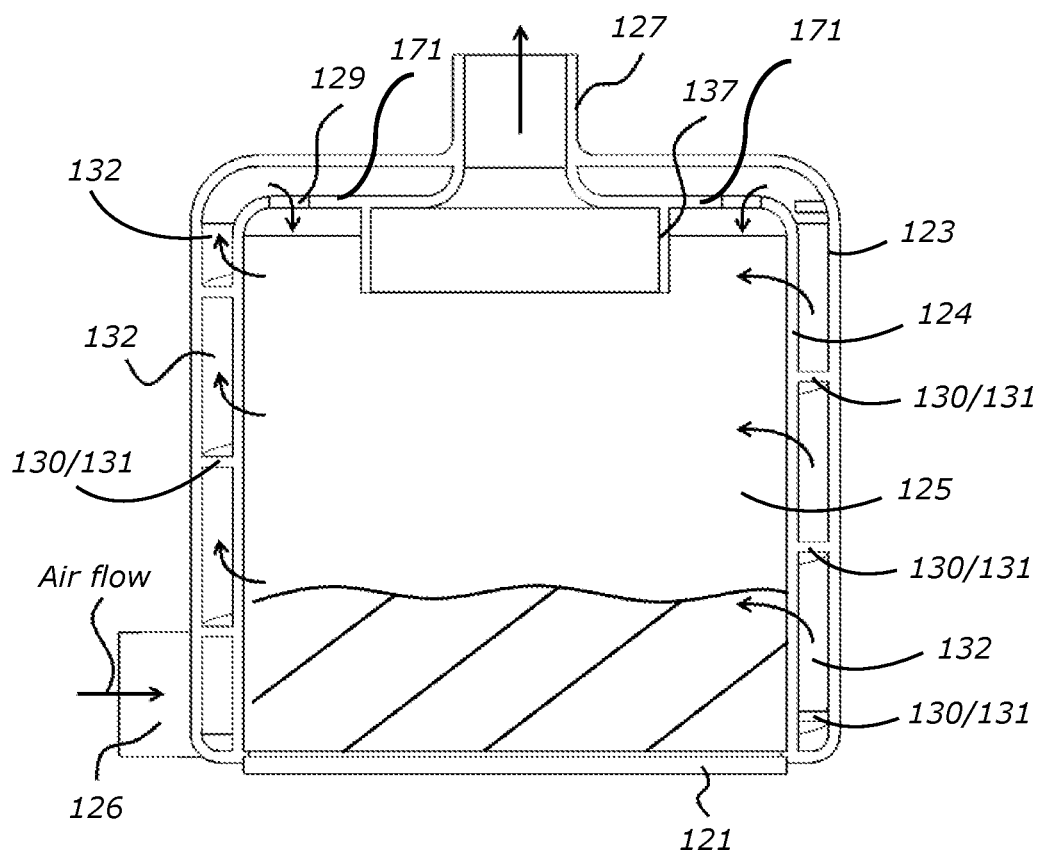
FIG. 8 is a cross-sectional side view taken along line A-A of FIG. 3.
Figure 9:
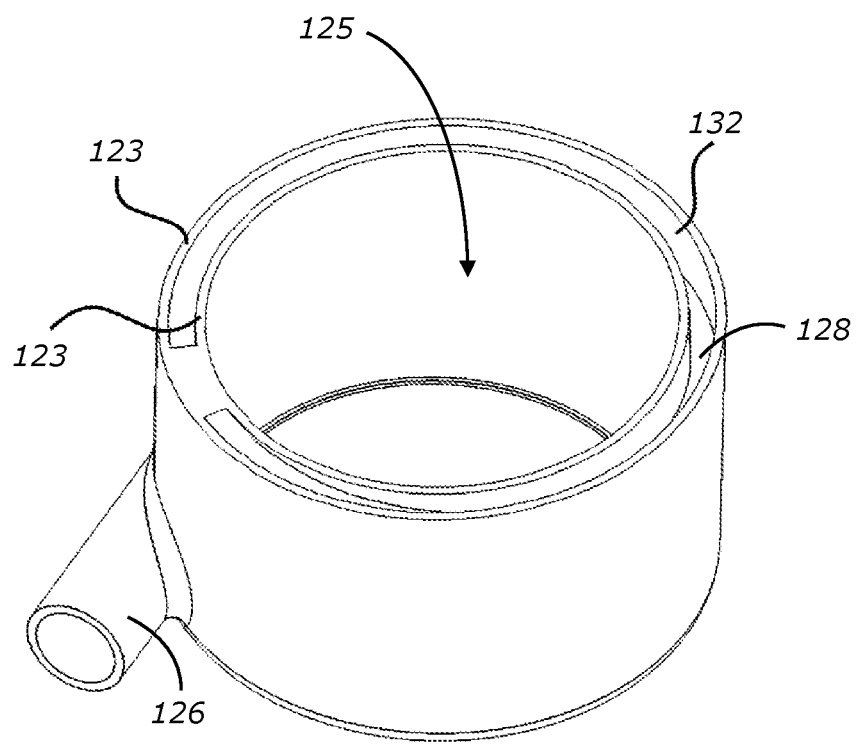
FIG. 9 is a cut-away perspective view taken along line B-B of FIG. 4.
Figure 10:
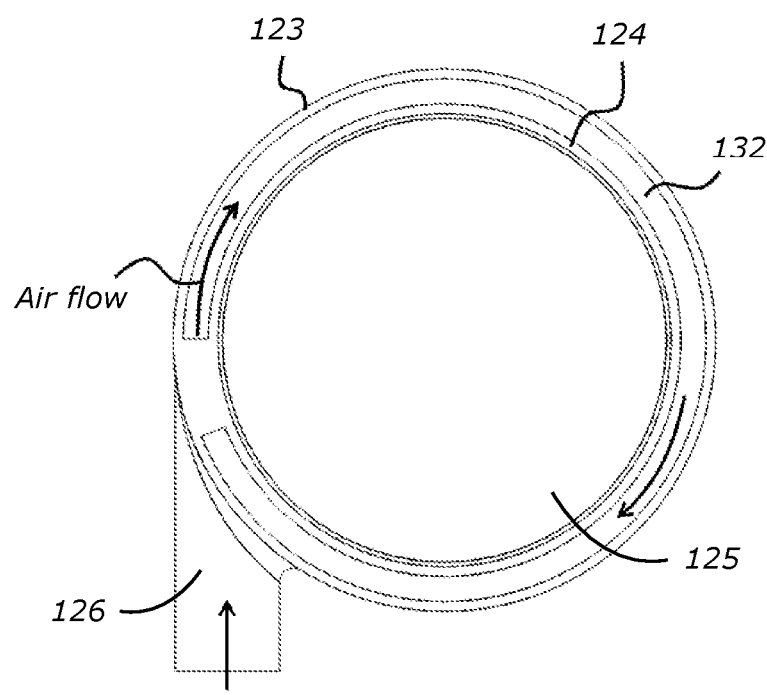
FIG. 10 is a cross-sectional top view taken along line B-B of FIG. 4.

In one form, the heat insulating material may comprise gas, such as breathing gas. For example, at least a portion of the gas flow path may be located within the wall cavity 128 before passing across the fluid reservoir 125. In this embodiment, the inlet(s) 126 of the humidification chamber 120 may be in fluid communication with the wall cavity 128, which may include one or more openings to the fluid reservoir 125 within the humidification chamber. Each opening to the fluid reservoir 125 forms a reservoir inlet 129. Preferably, the fluid reservoir inlet(s) 129 are located on an upper portion of the chamber 120, as shown in FIGS. 6 to 8. In one form, the chamber 120 comprises a plurality of fluid reservoir inlets 129 that are formed in a distribution member, such as a distribution plate. In one form, the humidification chamber 120 comprises one or more reservoir inlets 129 in an inner top wall 171. In one form, the inner top wall 171 may form part of the one or more inner wall(s) 124. The fluid inlets 129 are arranged to distribute gas flow from the wall cavity 128 across the humidification zone within the humidification chamber 120. The humidification zone is an area within the humidification chamber 120 that lies the above the surface of fluid within the fluid reservoir 125. Preferably, the fluid inlets 129 are arranged to distribute gas flow substantially evenly across the humidification zone. A gas flow path is provided from the chamber inlet(s) 126, through the wall cavity 128 and water reservoir inlet(s) 129, across the fluid reservoir 125, and out the delivery outlet 128 of the chamber, along which heated, humidified gas is delivered to a patient. The gas flow path may therefore pass through the wall cavity 128.

In one form, the wall cavity 128 may comprise a guiding system 130 that guides the air to follow a circuitous or tortuous path through the wall cavity 128. In one form, the guiding system 130 may be in the form of a guide 131 extending from the one or more inner side wall(s) 124 to the one or more outer side wall(s) 123 across the wall cavity 128. In one form, the guide 131 may be in the form of a guide wall 131. The guide system 130 may extend horizontally across the wall cavity 128. The guide system 130 may be oriented at an angle to the chamber base 121. The guide system 130 may therefore extend around a perimeter of the inner side wall(s) 124 to define a helical or spiral path through the wall cavity. In other words, the guide system 130, and therefore the guide 131 may be a helical structure extending between the inner side wall(s) 124 and the outer side wall(s) 123, and extending upwards from or from near to the base 121 towards the top wall 122. In one form, the guiding system 130 comprises one or more guides 131 configured to increase the length of the gas flow path through the wall cavity 128. In one form, the one or more guides 131 may be in the form of one or more baffles 131 configured to increase the length of the gas flow path through the wall cavity 128 of the humidification chamber 120. The guiding system baffle(s) 131 may have a thickness of 2 mm, or about 1.0 to about 2.5 mm. The chamber inlet 126 may comprise an opening into the wall cavity through the one or more outer side wall(s) 123.

The flow path followed by air being directed by the guiding system 130 is referred to in this specification as an insulating channel 132. The insulating channel 132 may have a thickness (distance between opposing surfaces of the outer and inner walls 123, 124) of 4.6 mm, or between about 4.0 to about 5.5 mm, being the preferred thickness of the wall cavity (i.e. the preferred distance between the outer and inner walls 123, 124 of the humidification chamber). The insulating channel 132 may have a second thickness or height (being the distance between a top surface of a lower location on the guiding system baffle, and a bottom surface an upper location of the guiding system baffle directly above, or rotated one full turn of the spiral beyond the lower location) of 28 mm, or about 25 to about 30 mm, providing a channel cross-sectional area of about 112.5-165 mm².

In one embodiment, as shown in FIGS. 7 and 8, the guiding system 130 comprises one or more sloping baffles 131 that are provided in the wall cavity 128 to define a helical or spiral insulating channel 132. The helical insulating channel 132 forms a helical gas flow path through the wall cavity 128. In this form, the helical baffle(s) 131 spiral within the cavity 128 between the outer and inner walls 123, 124. The insulating channel 132 may include any suitable number of turns of a helix between the humidification chamber inlet(s) 126 and the fluid reservoir inlet/s 129 to achieve the desired retention time of air within the insulating channel 132. For example, the insulating channel 132 may include two, three, four, five or more turns within the wall cavity 128. Preferably, the insulating channel 132 comprises three turns. The insulating channel 132 may be a helix with a radius of about 53 mm, and a pitch of about 30 mm. In at least one embodiment, the pitch may be about ⅓ of the height of the humidification chamber 120. Alternately, the insulating channel 132 may be a helix with a radius $R_{helix}$ and a pitch $P_{helix}$ where:

$$R_{helix} = R_{Chamber} + \frac{T}{2}$$

And:

$$P_{helix} = \frac{H_{chamber}}{N_{Turns}}$$

Where $R_{Chamber}$ is a radius of the humidification chamber 120 from a central point to the external surface of the inner wall, T is the thickness of the insulating channel 132 in a radial direction from the centre of the chamber 120, $H_{Chamber}$ is a height of the humidification chamber 120, or the distance between the chamber base 121 and the top wall 122 of the chamber 120, and $N_{Turns}$ is the number of turns of the helix.

In at least one embodiment, the insulating channel 132 has a thickness of about $0.1*R_{helix}$, and as a result:

$$R_{helix}=R_{Chamber}+X*R_{Chamber}=(1.1)R_{Chamber}$$

In at least one embodiment, $N_{Turns}=3$, therefore:

$$P_{helix} = \frac{H_{Chamber}}{3}$$

After breathing gas/air is blown into the inlet 126 of the humidification chamber 120, the air passes along the gas flow path through the helical insulating channel 132. The air is then directed to the fluid reservoir 125, through one or more fluid reservoir inlets 129, where the air is humidified before passing through the delivery outlet 127. In one form, as shown in FIGS. 6 to 8, an outlet baffle 137 prevents air directed into the water reservoir from directly passing through the outlet 127. The obstruction caused by the outlet baffle 137 keeps the air circulating within the fluid reservoir 125 for longer by reducing its ability to flow directly from the fluid reservoir inlets 129 to the delivery outlet 127. This improves the humidifying performance of the insulated humidification chamber 120. The delivery outlet 127 provides a flow path for breathing gas from the fluid reservoir 125 to external of the humidification chamber 120. The delivery outlet 127 and/or the fluid path may pass through the inner top wall.

Figure 11:
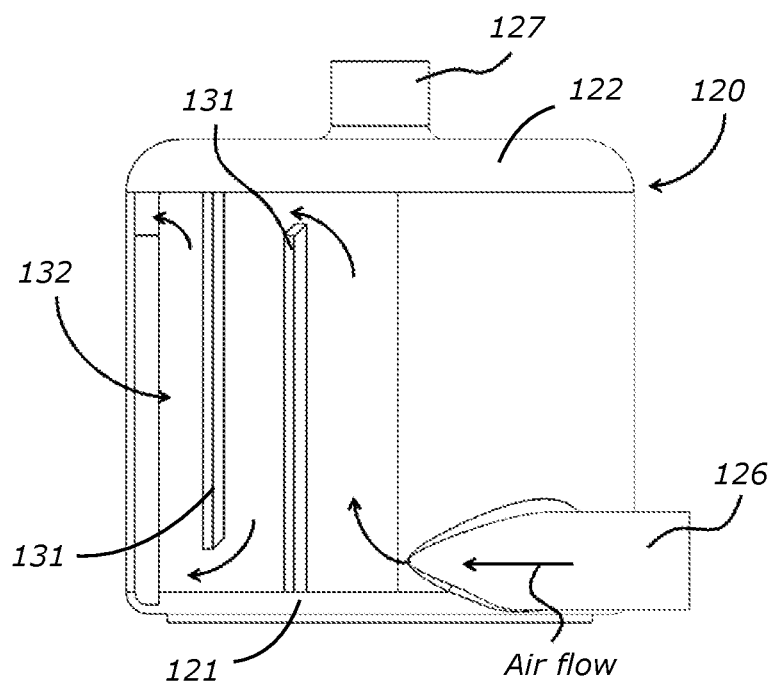
FIG. 11 is a partial cut-away side view of yet another form of humidification chamber according to the invention, in which the chamber wall includes a vertical baffle system.

In yet another form, as shown in FIG. 11, the guiding system 130 comprises one or more baffles 131, having a substantially perpendicular orientation relative to the base 121 of the humidification chamber 120. However, in other forms, the baffles could be angled from the perpendicular. The baffle(s) 131 may be provided in the wall cavity 128 to define a tortuous or serpentine gas flow path and insulating channel 132 through the wall cavity 128.

In this arrangement, air may zig-zag up and down as the air moves around the inner wall 124 from the chamber inlet(s) 126 to the fluid reservoir inlets 129 of the humidification chamber. The baffles may be of any suitable form. In one form, the baffles comprise plate members that extend radially from the inner wall to the outer wall.

Figure 12:
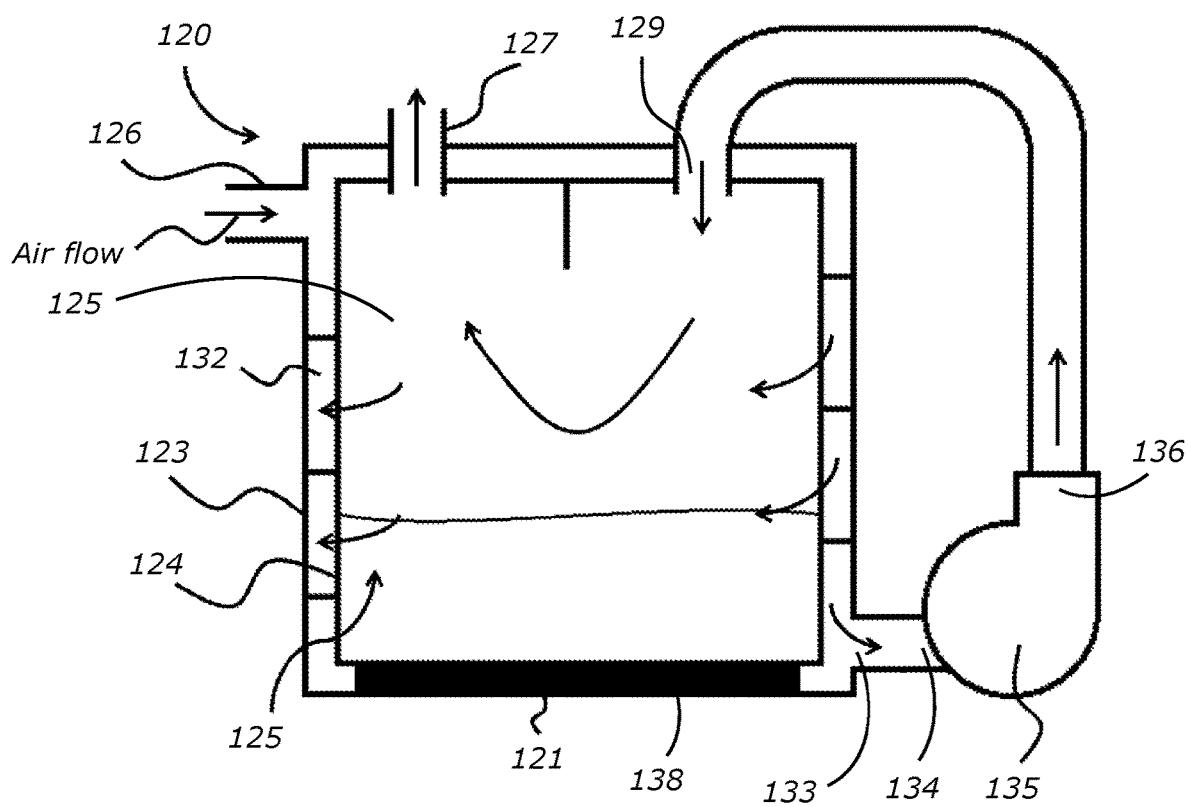
FIG. 12 is a schematic cross-sectional view of yet another form of humidification chamber according to the invention, in which the chamber wall includes a helical baffle system and chamber further includes a flow generator taking warm air from the insulating channel in the chamber wall cavity and blowing the air into the fluid reservoir of the chamber.

In yet another form, as shown in FIG. 12, the humidification chamber 120 comprises one or more chamber inlets 126, as described above. The inlet(s) 126 are preferably located at the upper portion 140 of the chamber 120 and proximate to the top wall 122 of the chamber. The inlet(s) 126 are in fluid communication with an insulating channel 132 passing through the wall cavity 128 of the chamber. In the embodiment illustrated, the insulating channel 132 is a helical channel circling around the inner wall 124 of the chamber. However, in other forms, the insulated channel may be a serpentine channel that snakes up and down in a substantially vertical or diagonal configuration around the inner wall of the chamber. The insulating channel 132 is in fluid communication with a first outlet 133. The first outlet 133 is preferably located proximate to the base 121 of the chamber. The first outlet 133 is in fluid communication with an inlet 134 of a flow generator 135, which also comprises a flow generator outlet 136. The flow generator outlet 136 is in fluid communication with one or more fluid reservoir inlets 129 within the chamber. Preferably, the fluid reservoir inlet(s) 129 are located on an upper portion of the chamber 120, as shown in FIG. 12. The humidification chamber 120 also comprises a delivery outlet 127 through which heated, humidified gas can pass. Preferably, the delivery outlet 127 is located in the top wall 122 of the chamber or in the upper portion of the chamber, proximate to the top wall 122. The delivery outlet 127 comprises a conduit portion extending through the wall cavity 128 of the chamber.

In this embodiment, air enters through the chamber inlet(s) 126, near the top of the insulated humidification chamber, and passes through the helical insulating channel 132 towards the first, lower chamber outlet 133. As the air passes through the insulating channel 132, the air is warmed by heat transfer from the heated fluid and air within the fluid reservoir 125, located on the other side of the inner wall 124. The warm air passes through the flow generator inlet 134 and is blown through the flow generator 135, where more heat is added by the energy and heat dissipation from the flow generator motor. The warm air exits the flow generator 135 through the generator outlet 136 and is blown into the fluid reservoir 125 of the insulated humidification chamber by passing through the fluid reservoir inlet(s) 129. The air is further heated in the fluid reservoir 125 and is also humidified before passing through the delivery outlet 127 of the humidification chamber for delivery to a patient.

In this configuration, the air is warmed as it passes the chamber base 121, and the lower region of the chamber 120 and is further warmed by the flow generator 135. The warmed air then passes along a short flow path to the fluid reservoir inlet(s) 129, so that the time taken for the warmed air to reach the fluid reservoir 125 is shorter than that for warmed air passing through the insulating channels 132 of the embodiments shown in FIGS. 7 to 11. In those embodiments, air passes the chamber base 121 and lower region of the chamber 120 earlier in its flow path. The air then passes through cooler, upper regions of the chamber 120 before entering the fluid reservoir 125. The embodiment shown in FIG. 12 can therefore deliver warm air to the fluid reservoir 125 faster to provide a more efficient system for heating and humidifying air.

Use of a helical or serpentine insulating channel in any of the previously described embodiments has a number of benefits. Air directed through the insulating channel encircles the inner wall of the insulated humidification chamber prior to being blown into the fluid reservoir. This allows control of the air retention time in the insulating channel by controlling parameters of the insulated humidification chamber, such as the insulating channel cross-sectional area, thickness, height, or length. The retention time of air within the insulating channel can be increased at a constant air flow rate by increasing the cross-sectional surface area of the insulating channel, such as by increasing the thickness of the channel (i.e. the distance between the inner and outer walls of the humidification chamber 120). Increasing the retention time can increase the heat transferred to the incoming air from the water reservoir that would ordinarily be wasted and therefore reduces the energy required to heat air within the fluid reservoir.

The humidification chamber may be configured to optimise its performance by providing an optimal retention time or air in the chamber to maximize the extent of heat transfer, but not to the extent that the chamber, and air flowing from the chamber, becomes so hot as to present a safety hazard or be unpleasant for the patient. For example, if the air is in the insulating channel for too short a period of time, the air may not absorb as much heat as it could. However, if the air is in the insulating channel for too long, the air becomes less effective at removing heat and the chamber and/or air within it may become overheated. Therefore, it is desirable to configure the insulating channel to provide a balance between these parameters for optimal performance. This may be achieved, for example, by selecting the number of turns of the channel, whether the channel is helical or serpentine or a combination of both, the dimensions of the channel and the dimensions and materials of the inner and outer walls. Such parameters may also be considered to optimise the pressure drop of air entering the chamber Various chamber inlet and delivery outlet configurations may be used with the humidification chamber of the invention. In one form, as shown in FIGS. 2 to 11, the chamber 120 may comprise one or more chamber inlets 126 located proximate to the base 121 of the chamber. A delivery outlet 127 may be located on or proximate to the top wall 122 or upper portion of the chamber 120. In another form, as shown in FIG. 13, the chamber inlet(s) 126 may be substantially parallel to the delivery outlet 127. Optionally, the chamber inlet 126 and delivery outlet 127 are located on the humidification chamber 120 at the same or similar vertical height. This embodiment may be particularly suitable for humidifiers used in hospitals where it is often preferable for the chamber inlet(s) and the delivery outlet of the humidification chamber to be co-axial and/or at a similar or the same vertical height. In this form, the humidification chamber 120 may comprise an inlet channel 126a, which is in fluid communication with the chamber inlet(s) 126 and with the insulating channel 132. Air passes through the chamber inlet(s) 126 and through the inlet channel 126a, which may comprise a vertical tube as shown, or a helical or spiral tube for example. The air then passes into and along the insulating channel 132 of the humidification chamber before passing through one or more fluid reservoir inlets 129 and into the fluid reservoir 125. The warmed air is heated further in the fluid reservoir 125 and is also humidified before passing through the delivery outlet 127 for delivery to a patient.

In one form, as shown in FIG. 14, the humidification chamber 120 may comprise a base 121 that comprises or consists of a heating element 138 that directly heats water within the fluid reservoir 125. In this form, the air/gas flow path between the chamber inlet 126 and outlet 127 may include a section that passes beneath the heating element 138 in the chamber base 121 to allow heat to be transferred from the heating element 138 to the air passing along the gas flow path beneath the heating element 138. In this configuration, air flowing through the chamber 120 is able to be heated more by heat transfer from the heating element 138. In one form, the heating element 138 in the chamber base 121 is supported by one or more supports 139. Each support 139 may be configured to hold or guide one or more electrical connections, such as wires, that pass through or along the supports 139 to power the heating element 138. The humidification chamber 120 may include any other suitable form of electrical contact, such as a plug, through which the heating element may be powered. In one form, the humidifier 112 may comprise an inductive heater to heat the heating element 138 in the humidification chamber base 121 via induction, In this form, the heating element 138 does not require one or more supports 139 to hold or guide wires/electrical connections to the heating element 138. In one form, a heater plate may be disposed between the heating element 138 and the interior of the humidification chamber 120. The heating element 138 may be connected to an underside of the heater plate. The heating element 138 may be physically connected to the heater plate. For example, the heating element 138 may be connected to the heater plate with adhesive, double-sided tape, glue, screws and/or a latch arrangement.

Figure 17:
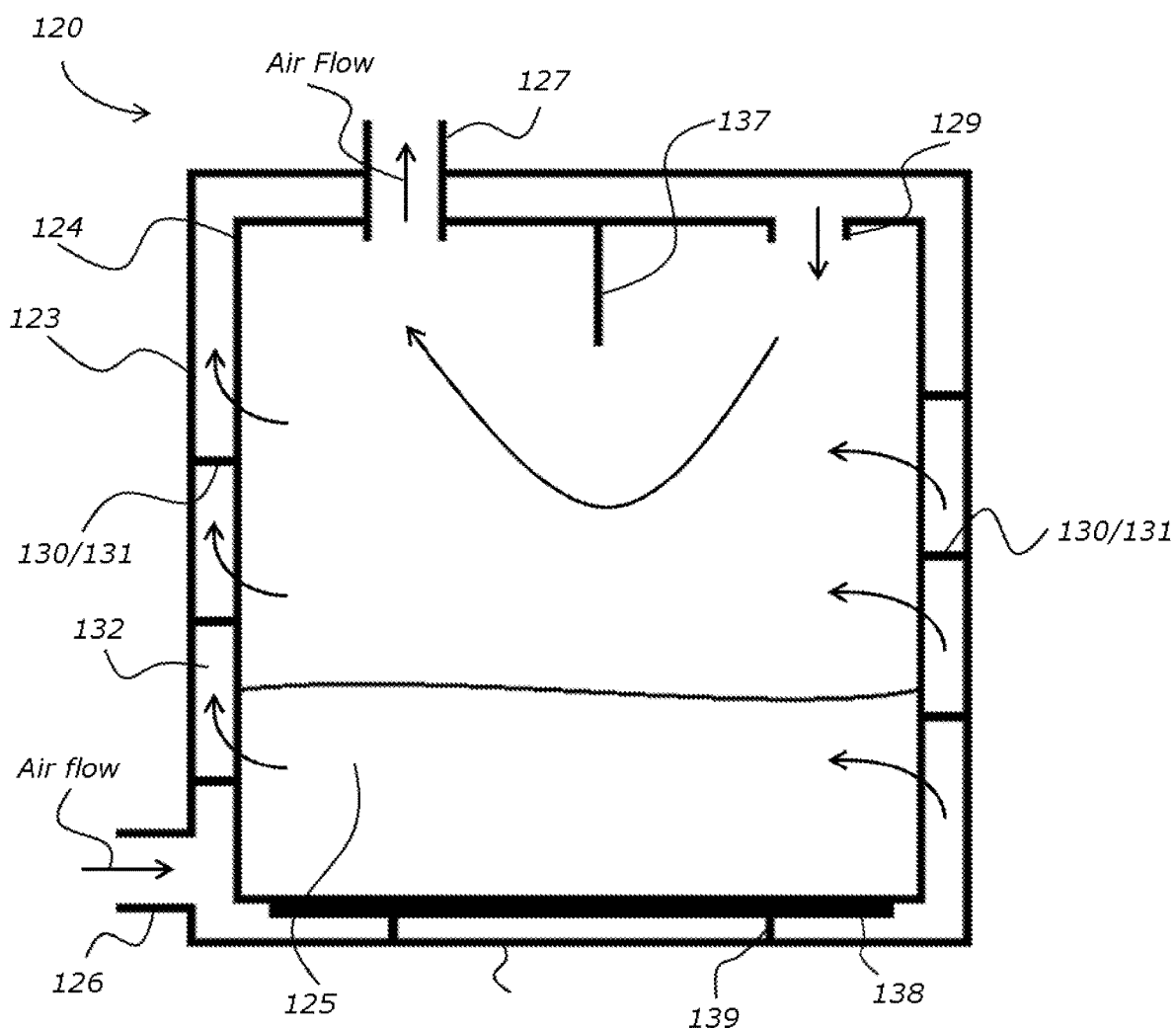
FIG. 17 is a schematic cross-sectional view of another form of humidification chamber according to the invention, which shows an alternative configuration of chamber inlet, outlet and fluid flow path through the chamber wall cavity.

FIG. 17 shows another form of a humidification chamber 120. The humidification chamber 120 of FIG. 17 can be substantially similar to previously disclosed humidification chambers 120, with at least the notable distinctions that breathing gas is delivered through the inlet 126 from a flow generator, and passes the heating element 138 and one or more supports 139 as it passes through the insulating channel 132. The breathing gas passes the heating element 138 and one or more supports 139 downstream of the flow generator. The breathing gas is directed past the heating element 138, and heat from the heating element 138 is transferred to the breathing gas. Each support 139 may again be configured to hold or guide one or more electrical connections, such as wires, that pass through or along the supports 139 to power the heating element. The breathing gas is directed through the insulating channel 132 and into the fluid reservoir 125 via one or more reservoir inlet/s 129. The one or more reservoir inlet/s 129 may be similar to the reservoir inlets 129 described with reference to FIG. 6. The breathing gas is humidified and directed through the outlet 127 and on towards the user. This configuration is advantageous because, during operation of the heating element 128, there may be a loss of heat energy that is dissipated from the bottom of the heating element 128. In the illustrated configuration, at least some of this energy is captured by the breathing gas passing the underside of the heating element 128. In one form, a heater plate may be disposed between the heating element 138 and the interior of the humidification chamber 120. The heating element 138 may be connected to an underside of the heater plate. The heating element 138 may be physically connected to the heater plate. For example, the heating element 138 may be connected to the heater plate with adhesive, double-sided tape, glue, screws and/or a latch arrangement.

Optionally, the outer and/or inner wall(s) 123, 124 of the humidification chamber 120 may be transparent or semi-transparent. For example, one or both walls 123, 124 of the chamber may be made from a plastic material, such as polycarbonate or polypropylene for example, that is preferably transparent or semi-transparent. In this form, from the outside of the chamber, it is possible to see the fluid level of fluid in the fluid reservoir 125 within the chamber. A user can therefore easily identify when the fluid reservoir needs to be filled. An inner or outer surface of the chamber may be marked to provide an indication of the ideal and/or maximum water level to which the chamber is to be filled.

The humidification chamber 120 may be formed using any suitable manufacturing process. For example, the humidification chamber 120 may be injection moulded as one part. Alternately, if different materials are desired for the outer wall 123, inner wall 124 and/or the guiding system baffle(s) 131, each part may be separately moulded or fabricated in any number of ways known by the person skilled in the art, and then separately attached. The parts could be attached using any suitable attachment method, such as by interference fit, adhesion, ultrasonic welding, radio frequency welding, for example.

In one form, the interior and/or exterior surface/s of the outer wall 123 and/or the inner wall 124 may be coated with reflective coatings suitable for reflecting the heat energy radiated from the heated bodies within the chamber 120, such as the heater plate and water within the fluid reservoir 125 for example. In another form the outer and/or inner wall 123, 124 may be formed from a heat reflective material. In both forms, further efficiencies may be provided to the humidification chamber 120 as heat energy may be more readily transferred across the inner wall 124 and/or heat losses through the outer wall 123 are reduced.

The guiding system 130 of the insulated humidification chamber 120 provides a humidifier and respiratory therapy system using the chamber 120 with enhanced energy efficiency. For example, in standard humidification chambers, at least some heat is dissipated from the chamber base, fluid within the fluid reservoir and/or air to the outer environment through the walls of the humidification chamber. Heat loss is typically by conduction and radiation. In the humidification chamber 120 of the present invention however, because the incoming air is circulated through an insulating channel 132 within the wall cavity 128 surrounding the inner wall(s) 124 of the chamber, prior to entering the fluid reservoir 125, a portion of the heat that would ordinarily be dissipated to the environment is instead transferred to the incoming air. This reduces heat loss and also reduces the energy and time required to heat the gas within the fluid reservoir 125. The outer wall 123 and the air circulating through the insulating channel 132 acts as another layer of insulation. The air that absorbs heat energy while passing though the insulating channel 132 allows what would ordinarily be waste heat to be recycled.

Another advantage of the guiding system 130 is that it may provide greater control over the distribution of air within the fluid reservoir. The guiding system may also provide greater control over the extent to which air is heated in the wall cavity, by reducing the possibility for stagnation to occur in certain areas of the wall cavity if the guiding system 130 was not in place.

A key parameter relevant to the design of a humidification chamber 120 is the pressure drop of air flow passing through the chamber. If the pressure drop is too large, even if the chamber performs better by reducing energy losses, the performance gain may be negated by the required increase in power at the pressure source to overcome the pressure drop.

In one form, the humidification chamber inlet 126 may be arranged substantially tangentially to the perimeter of the insulated humidification chamber 120, such as to the circumference of a chamber having a cylindrical outer wall 123. Such an inlet orientation reduces the pressure drop produced by the insulated humidification chamber 120.

Tests have been conducted to compare the pressure drop of the insulated humidification chamber 120 with guiding system 130 to a prior art Fisher & Paykel Healthcare HC300 humidification chamber. These tests provided air to both chambers at a flow rate of 40 L/min. The tests showed that the pressure drop of the insulated humidification chamber with guiding system was 0.63 cmH2O, and the pressure drop of the HC300 chamber was 0.21 cmH2O.

The performance of the insulated humidification chamber with guiding system has also been tested and compared with the performance of the prior art HC300 humidification chamber when used with a Fisher & Paykel Healthcare HC200 CPAP (Continuous Positive Airway Pressure) system.

Figure 15:
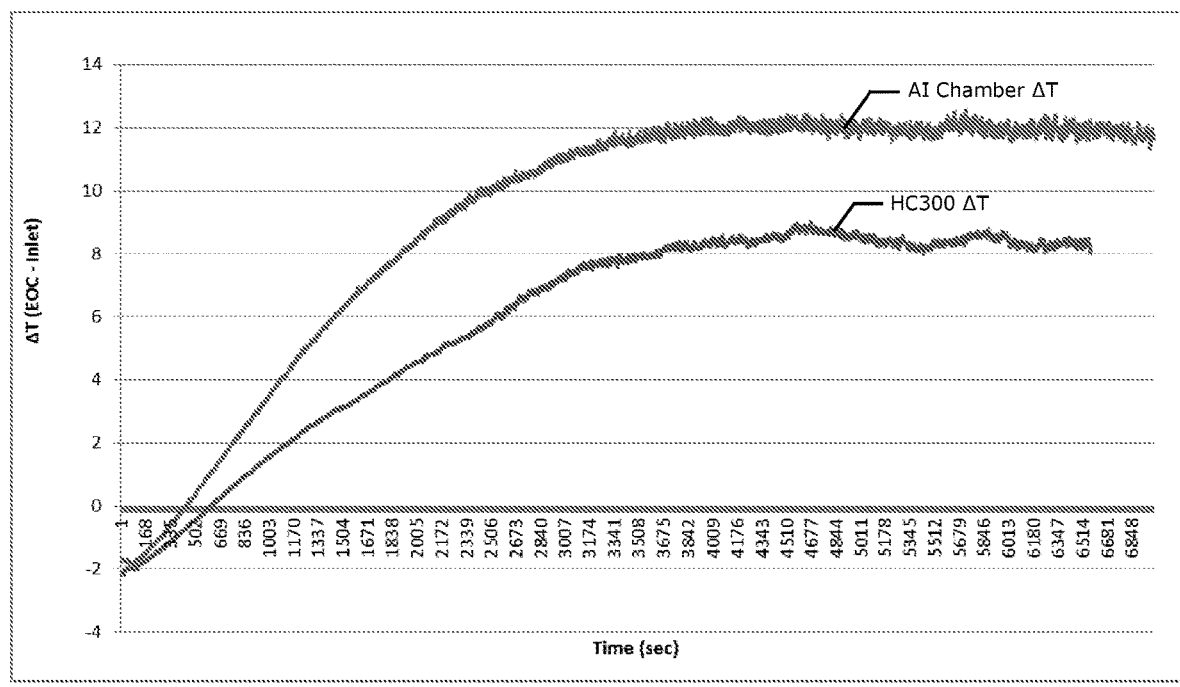
FIG. 15 is a chart comparing the temperature difference between inlet air and outlet air of the humidification chamber of the invention and a prior art humidification chamber.

FIG. 15 shows a chart comparing the temperature difference between inlet air and outlet air of the insulated humidification chamber and the HC300 humidification chamber. The data is shown with a heater plate powered at 45W. The chart shows that the insulated humidification chamber of the invention heats the incoming air at a significantly faster rate than the HC300 chamber when both chambers are delivered the same amount of power. The difference in performance is indicated by the higher gradient of the insulated humidification chamber data compared to the HC300 data. In addition to this, even though both chambers operated at the same power level, the insulated humidification chamber is capable of heating air to a higher overall temperature than the HC300 chamber. The test therefore shows that the insulated humidification chamber of the invention exhibits superior performance to the prior art chamber. In the conducted test, the difference in steady-state temperature differed by approximately 40%.

Figure 16:
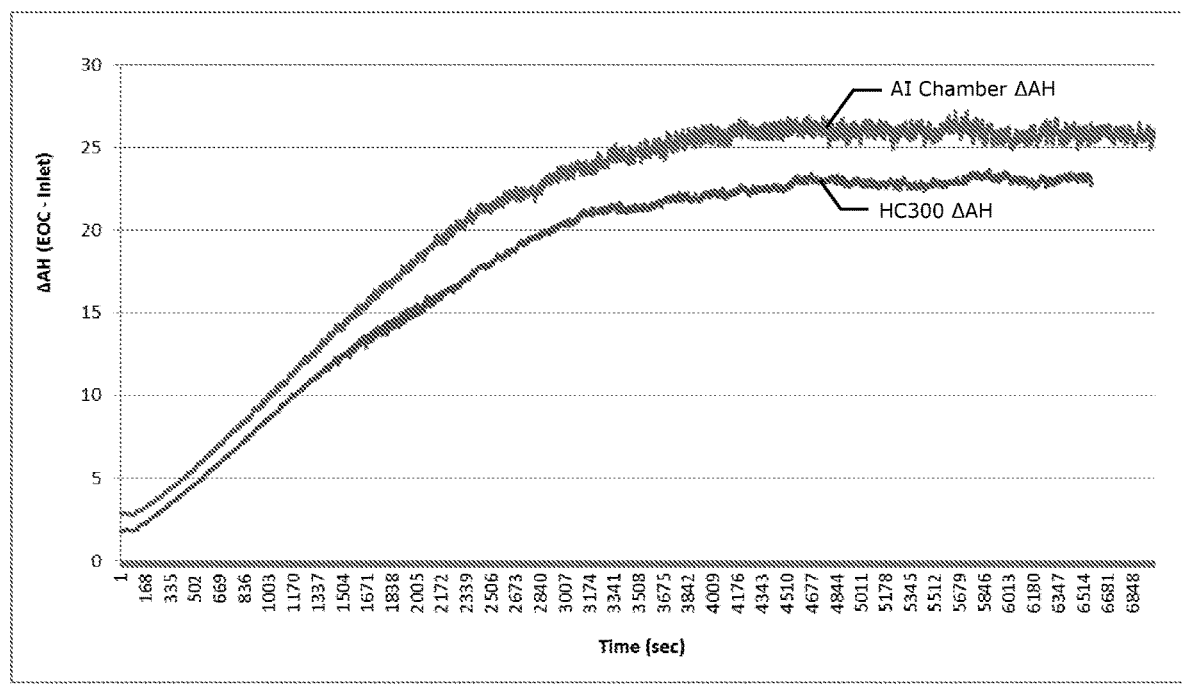
FIG. 16 is a chart comparing the absolute humidity difference between inlet air and outlet air of the humidification chamber of the invention and a prior art humidification chamber.

The humidification performance of the insulated humidification chamber of the invention was also compared to that of the HC300 humidification chamber, with both chambers receiving the same amount of power (45W). FIG. 16 shows a chart comparing the absolute humidity difference between inlet air and outlet air of the insulated humidification chamber and the HC300 humidification chamber. As can be seen from FIG. 16, the insulated humidification chamber humidifies air passing through the chamber to a greater extent than air passing through the HC300 chamber.

A snapshot of the raw data from the above test is shown in Tables 1 and 2.

TABLE 1

Insulated Humidification Chamber temperature experiment data

| Insulated Humidification Chamber HP Power (W) | Inlet | | | | EOC | | | |
| --- | --- | --- | --- | --- | --- | --- | --- | --- |
| | S1_T | S1_RH | S1_AH | S1_Eth | S2_T | S2_RH | S2_AH | S2_Eth |
| 45 | 25.97 | 32.52 | 7.9 | 43.3 | 32.49 | 84.64 | 29.38 | 96.7 |
| 35 | 25.30 | 33.43 | 7.83 | 42.4 | 31.77 | 72.75 | 23.96 | 84.2 |
| 30 | 25.49 | 32.07 | 7.59 | 42.1 | 30.76 | 68.68 | 21.88 | 78.6 |
| 25 | 25.57 | 30.77 | 7.32 | 41.6 | 29.40 | 66.14 | 19.34 | 71.7 |

TABLE 2

| HC300 temperature experiment data | | | | | | | | |
|---|---|---|---|---|---|---|---|---|
| HC300 HP | Inlet | | | | EOC | | | |
| Power (W) | S1_T | S1_RH | S1_AH | S1_Eth | S2_T | S2_RH | S2_AH | S2_Eth |
| 45 | 26.09 | 32.82 | 8.03 | 43.7 | 31.02 | 88.68 | 28.30 | 92.8 |
| 35 | 25.82 | 31.34 | 7.57 | 42.4 | 29.38 | 78.65 | 22.98 | 79.5 |
| 30 | 25.84 | 29.53 | 7.15 | 41.5 | 28.48 | 70.77 | 19.79 | 71.7 |
| 25 | 25.54 | 29.93 | 7.1 | 41.1 | 27.53 | 67.25 | 17.71 | 66.2 |

T = temperature
Eth = enthalpy
RH = relative humidity
EOC = end of chamber
AH = absolute humidity A summary of the improvements of the insulated humidification chamber (IHC) compared to the HC300 chamber is shown in Table 3.

TABLE 3

| Improvements of insulated humidification chamber over HC300 chamber Δ(EOC-Inlet) | | | | |
|---|---|---|---|---|
| | AI Chamber_acrylic | | | |
| HP Power (W) | T | RH | AH | Eth |
| 45 | 6.52 | 52.12 | 21.48 | 53.47 |
| 35 | 6.47 | 39.32 | 16.13 | 41.74 |
| 30 | 5.27 | 36.61 | 14.29 | 36.48 |
| 25 | 3.83 | 35.37 | 12.02 | 30.05 |
| | HC300 Chamber | | | |
| HP Power (W) | T | RH | AH | Eth |
| 45 | 4.93 | 55.86 | 20.27 | 49.17 |
| 35 | 3.56 | 47.31 | 15.41 | 37.15 |
| 30 | 2.64 | 41.24 | 12.64 | 30.17 |
| 25 | 1.99 | 37.32 | 10.61 | 25.07 |
| HP Power (W) | % = (AI − HC300)/HC300 | | | |
| 45 | 32.25 | −6.70 | 5.97 | 8.75 |
| 35 | 81.74 | −16.89 | 4.67 | 12.36 |
| 30 | 99.62 | −11.23 | 13.05 | 20.94 |
| 25 | 92.46 | −5.23 | 13.29 | 19.83 |

The table shows that at a heater plate power of 45W, the insulated humidification chamber produces an approximately 32.3% higher temperature at the outlet compared to the HC300. The net output absolute humidity was increased at 45W by about 6%. Additionally, the net output enthalpy at 45W was increased by about 8.8%.

Therefore, it can be seen that the insulated humidification chamber of the invention provides the same operating parameters relative to existing humidification chambers, but has greater energy efficiency. In particular, the insulated humidification chamber allows the humidifier and respiratory therapy system comprising the chamber to operate at lower power levels than existing humidifiers and respiratory therapy systems because less energy is required to heat air within the humidification chamber and to regulate the temperature of water within the humidification chamber. For example, the air circulation path through the tunnel allows recycling of some of the heat that would have ordinarily been lost through the wall of the humidification chamber, decreasing the electrical energy required to operate the system at constant parameters. The insulated humidification chamber of the invention also provides a faster humidification response than known humidification chambers. Another advantage of the insulated humidification chamber is that the thermal output may be controlled more easily and more accurately than prior art chambers because of low heat loss and fast thermal response.

It is likely possible to further improve the performance of the insulated humidification chamber by coating the interior and/or exterior surface/s of the inner wall and/or the outer wall with reflective coatings suitable for reflecting the heat energy radiated from the heated bodies within the chamber, such as the heater plate and water within the fluid reservoir for example.

The foregoing description of the invention includes preferred forms thereof. Modifications may be made thereto without departing from the scope of the invention.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

Where, in the foregoing description reference has been made to integers or components having known equivalents thereof, those integers or components are herein incorporated as if individually set forth.

The disclosed methods, apparatus and systems may also be said broadly to comprise the parts, elements and features referred to or indicated in the disclosure, individually or collectively, in any or all combinations of two or more of said parts, elements or features.

Recitation of ranges herein is merely intended to serve as a shorthand method of referring individually to each separate sub-range or value falling within the range, unless otherwise indicated herein, and each separate sub-range or value is incorporated into the specification as if it were individually recited herein.

Reference to any prior art in this specification is not, and should not be taken as, an acknowledgement or any form of suggestion that that prior art forms part of the common general knowledge in the field of endeavour in any country in the world.

Certain features, aspects and advantages of some configurations of the present disclosure have been described with reference to use of the gas humidification system with a respiratory therapy system. However, certain features, aspects and advantages of the use of the gas humidification system as described may be advantageously be used with other therapeutic or non-therapeutic systems requiring the humidification of gases. Certain features, aspects and advantages of the methods and apparatus of the present disclosure may be equally applied to usage with other systems.

Although the present disclosure has been described in terms of certain embodiments, other embodiments apparent to those of ordinary skill in the art also are within the scope of this disclosure. Thus, various changes and modifications may be made without departing from the spirit and scope of the disclosure. For instance, various components may be repositioned as desired. Moreover, not all of the features, aspects and advantages are necessarily required to practice the present disclosure. Accordingly, the scope of the present disclosure is intended to be defined only by the claims that follow.

The invention claimed is:

1. A humidification chamber for a respiratory therapy system, the humidification chamber being configured to hold a humidifying fluid in a humidifying fluid reservoir, and comprising:
    a base, a top wall, and an outer side wall extending between the base and the top wall;
    an inner side wall spaced at a distance from the outer side wall to form a wall cavity between the inner side wall and the outer side wall, the wall cavity defining a gas flow path that is around an outside of the humidifying fluid reservoir, an interior surface of the inner side wall defining an outer perimeter of the humidifying fluid reservoir;
    a guide extending from the inner side wall to the outer side wall across the wall cavity, the guide defining an insulating channel through the wall cavity;
    a chamber inlet for receiving breathing gas, the chamber inlet comprising an opening into the wall cavity;
    a humidifying fluid reservoir inlet, the humidifying fluid reservoir inlet providing a path for gas to flow from the wall cavity to the humidifying fluid reservoir after passing over a surface of the humidifying fluid; and
    a delivery outlet for delivering breathing gas from the humidifying fluid reservoir externally of the humidification chamber,
    wherein the insulating channel, the humidifying fluid reservoir inlet, and the humidifying fluid reservoir provide a chamber gas flow path that extends between the chamber inlet and the delivery outlet such that flow passes from the chamber inlet to the insulating channel to the humidifying fluid reservoir to the delivery outlet.

2. The humidification chamber of claim 1, wherein the humidification chamber comprises an inner top wall, the inner top wall forming a top of a humidification space within the humidifying fluid reservoir, the humidifying fluid reservoir inlet extending through the inner top wall.

3. The humidification chamber of claim 2, wherein the base, inner side wall and inner top wall of the humidification chamber form the humidifying fluid reservoir.

4. The humidification chamber of claim 1, wherein the humidification chamber also comprises a heating element that is configured to be heated in order to provide heat to the humidifying fluid in the humidification chamber.

5. The humidification chamber of claim 1, wherein the chamber inlet comprises an opening into the wall cavity through the outer side wall.

6. The humidification chamber of claim 1, wherein the guide is configured such that the insulating channel comprises a helical portion between the chamber inlet and the humidifying fluid reservoir inlet.

7. A humidifier for a respiratory therapy system, the humidifier comprising the humidification chamber of claim 1.

8. The humidification chamber of claim 1, wherein the guide comprises one or more baffles that have a substantially perpendicular orientation relative to the base of the humidification chamber and that define a tortuous path of the gas flow path defined through the wall cavity.

9. The humidification chamber of claim 1, wherein the guide comprises at least one baffle defining the insulating channel through the wall cavity.

10. The humidification chamber of claim 9, wherein the guide comprises one or more sloping baffles that define the gas flow path defined by the wall cavity.

11. The humidification chamber of claim 10, wherein the one or more sloping baffles define a helical path of the gas flow path defined by the wall cavity.

12. The humidification chamber of claim 11, wherein the helical path includes three turns.

13. The humidification chamber of claim 1, wherein the inner side wall and/or the outer side wall is transparent or semi-transparent.

14. The humidification chamber of claim 1, wherein the chamber inlet is located proximate to the base of the humidification chamber.

15. The humidification chamber of claim 1, wherein the humidifying fluid reservoir defines a humidification zone above a surface of the humidifying fluid in the humidifying fluid reservoir, the humidification zone having area defined by the outer perimeter of the humidifying fluid reservoir.

* * * * *